Feb. 8, 1944.  R. M. GREENLEAF ET AL  2,341,141
WHEEL BALANCE TESTING APPARATUS
Filed Sept. 9, 1940   2 Sheets-Sheet 1
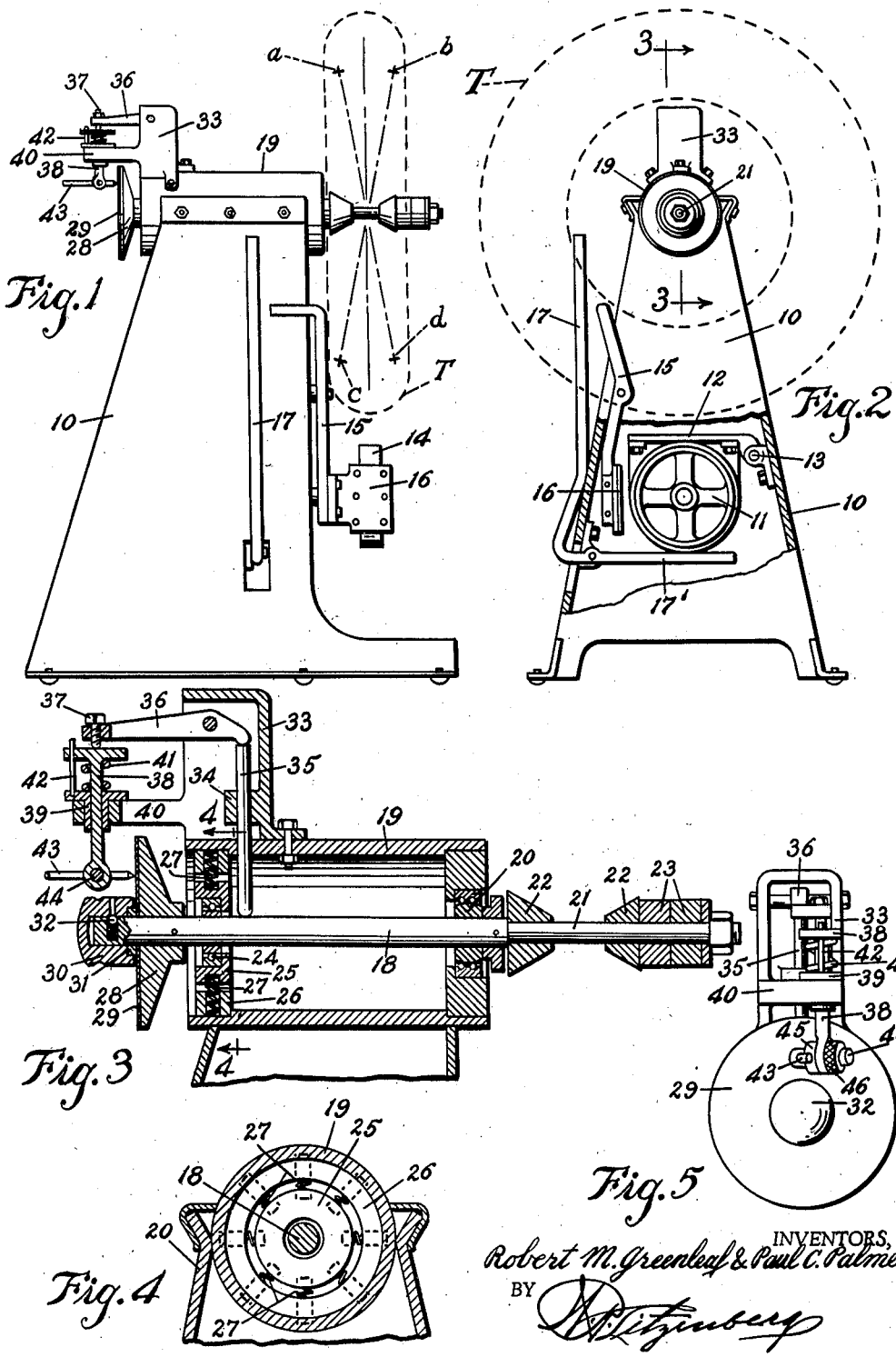
INVENTORS,
Robert M. Greenleaf & Paul C. Palmer
BY Patented Feb. 8, 1944

2,341,141

UNITED STATES PATENT OFFICE 2,341,141

WHEEL BALANCE TESTING APPARATUS

Robert M. Greenleaf and Paul C. Palmer, Los Angeles, Calif., assignors, by mesne assignments, to Frank R. Pendleton, trustee for ML Trust, Everett, Wash.

Application September 9, 1940, Serial No. 355,990

3 Claims. (Cl. 73—53)

Our invention is more particularly designed for testing the condition of balance of automobile, airplane and other wheels, although we do not limit it to any particular use.

The greatly increased speed at which automobiles are driven requires that the wheels thereof be in the best balance under all conditions if the best results are to be had in smooth and noiseless running. A wheel and tire may be in static balance, or that balance in which the wheel will rest at any position to which it is turned by hand, and yet not be in balance dynamically, or when running at high speed, for there are stresses which affect the balance of a wheel running at high speed, and there are cases where other factors which are dormant or quiescent when a wheel is still, which affect the dynamic balance of the wheel under speed.

It is an object of our invention to provide an apparatus by means of which a wheel can be tested under all conditions and a true balance worked out therefor in a simple and practical manner, and to provide such a machine which the average mechanic can easily operate and therewith correct any unbalanced wheel.

In order to explain our invention more in detail, we have shown one embodiment thereof on the accompanying sheets of drawings, which we will now describe:

Figure 1 is a side elevation of an apparatus embodying our invention;

Figure 2 is a view from the right hand end of Fig. 1, with a part broken out;

Figure 3 is a vertical sectional view taken on the line 3—3 of Fig. 2;

Figure 4 is a fragmentary sectional view taken on line 4—4 of Fig. 3;

Figure 5 is an end view from the left hand end of the top portion of Fig. 1.

Figure 6:
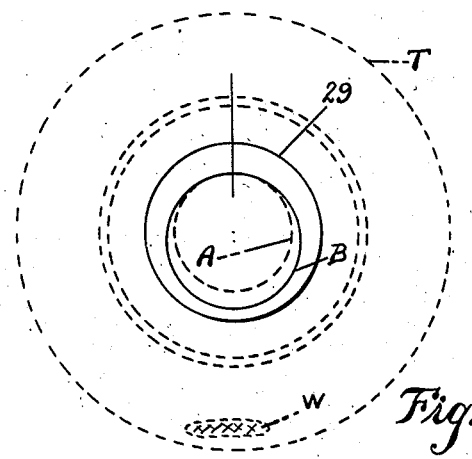
Figures 6, 7, 8 and 9 are chart readings in connection with a wheel test.

Referring now in detail to the drawings, the apparatus is mounted upon any suitable standard or support, which in this showing is a metal, tapering box-like structure indicated as a whole as 10, showing a motor 11 suspended therein from a platform 12, hingedly connected to the inside of said structure, as at 13. On the motor shaft, outside of the structure is a drive pulley 14, with a pivoted brake lever 15, with brake shoe 16, for stopping the drive pulley at will.

Also pivotally mounted in the structure 10, is a power lever 17, having one end 17' underlying the motor 11, whereby said motor can be raised sufficiently by hand, at will, to bring the drive pulley 14, into driving engagement with the tire T of a wheel which is to be tested. This mechanism, of course, can be modified and only shows one method of imparting speed to the wheel to be tested by engagement with the tire of said wheel.

Referring now to Fig. 3, a main shaft 18 is mounted in a housing 19, at its right hand end in a rocking, ball bearing mechanism at 20, which serves as a fulcrum for said shaft. An extension 21, of said shaft is provided with cones 22, 22, and spacers 23, 23, for centering and holding a wheel hub in place thereon, as indicated in light broken lines in Figs. 1 and 2. This mechanism, of course, will be adapted to the kind of wheel to be mounted thereon.

The other end of said shaft 18 is mounted in ball bearings 24, in a ring or body 25, which in turn is yieldingly supported within another ring or body 26, with a series of radially disposed coiled springs 27, 27, whereby the end of said shaft can be moved yieldingly laterally, said supporting bearing mechanism being held in the end of the housing or case 19, as clearly indicated.

Mounted on the outer end of said shaft 18 is a disc-like member 28, adapted to have mounted on its face, over said shaft, a record disc 29, held in place by means of a cap 30, with pressure gasket or member 31 therebetween to hold said record disc 29 from turning. This cap is shown with a spring-pressed ball means 32 for holding it in place on said shaft and making it easy to remove.

Mounted on top of said housing 19, is an upstanding housing or hood 33, in which there is a guide lug 34, through which is slidably mounted a pin 35, which extends down through the housing 19 and rests upon the main shaft 18. In the top of said hood is pivotally mounted a rocker arm 36, one end of which rests upon the upper end of the pin 35, and the other and longer end of which is provided with an adjustable contact screw 37, which bears upon the upper end of a plunger member 38, sliding through a bushing 39, seated in a shelf-like member 40, extending out from said hood 33. Said plunger member 38, has a coiled spring 41 under its head and resting at its lower end upon the bushing 39 for normally holding said plunger member 38 in its raised or up position. A pin 42, seated at its lower end in the flange of the bushing 39 extends up through the head of the plunger member 38, and slides therethrough to keep said plunger member from turning as it is moved up and down through said bushing 39.

In the lower end of said plunger member 38, a pencil 43 is adjustably held by being inserted through a hole in a short shaft 44, rotatably held in the lower end of said plunger member 38, and adapted to be held by means of a washer-like member 45 bearing against the side of the pencil, with a hand nut 46, threaded on said short shaft and adapted to be tightened against the side of the end of said plunger member 38, whereby to draw the short shaft 44, and to press the pencil against the washer-like member 45, so as to hold it at the desired position or angle to mark the record-receiving disc 29, and to indicate any vertical movement of the end of the shaft 18, caused by any unbalanced condition of the wheel and tire on the other end of said shaft. The adjustability of said pencil holder, makes it possible to take different records on one disc.

It will be noted that the movement of the end of said shaft 18, and of the record-receiving disc 29 thereon, will cause a reverse movement of the pencil holding mechanism. This is caused through the plunger rod 35, and the rocker arm 36, and the member 38, and can be multiplied and regulated as may be desired by changing the leverage.

When a wheel is mounted on the fulcrumed end of the shaft 18, and centered by means of the cones 22, 22, and is, therefore, properly supported for testing purposes, and the pencil 43 has been adjusted to contact the record-receiving disc 29, if now the wheel is turned by hand, a circle will be prescribed on the record-receiving disc 29 which will be concentric with the center of the shaft and of the axis of the wheel. This will indicate what we have called the static balance of the wheel, or that balance wherein a wheel turning on a free running bearing will remain in any position to which it is turned by hand, assuming, of course, that the wheel has been thus tested and balanced before making the record by turning the wheel slowly by hand.

When a wheel is thus mounted on the extended end of said shaft 18, it will be evident that the opposite end of said shaft will naturally be raised, if not controlled or held. We have provided the radial springs mechanism for thus holding this recording end of said shaft, and these springs yieldingly hold said shaft.

If now the power be applied to the wheel, as described, and the wheel be turned to high speed, if there is no vibration in the wheel, when the pencil is moved into engagement with the disc 29, in the same position, the circle prescribed will coincide exactly with the circle made when the wheel was turned slowly by hand, but any spot weight or out-of-balanced condition of the wheel, will cause said wheel to vibrate or move out of a true circle, and this movement or vibration in the wheel at the fulcrumed end of the shaft 18, will cause the reverse movement of the opposite end of said shaft and the disc 29, and this movement will be indicated on the disc if the pencil is moved against the disc during the high revolution of the wheel, whereupon a comparison of the records made on the disc can be made.

Any weight or force which causes the wheel to move upwardly or downwardly under high speed will operate to move the opposite end of said shaft 18 in the opposite direction, and will also operate to move the pencil in the opposite direction. In other words, any weight in a tire which would cause the wheel, under high speed, to move upwardly, would move the opposite end of said shaft downwardly and with it the record-receiving disc 29, and would also operate to move the pencil upwardly, causing this relative movement between the disc 29 and the pencil. While the radial springs 27, 27, yieldingly hold the shaft and the disc 29, the weight of the wheel causes the upper springs to be under more compression than the lower springs. It is clear, therefore, if any weight tends to cause the wheel to vibrate or to move under centrifugal force, it is understood that it would move upwardly more than downwardly for the reason that the lower springs 27, 27, on the underside of the bearing 24, are under less compression and would permit that end of the shaft to move downwardly further than upwardly against the upper springs which are already under certain compression by reason of the weight of the wheel.

It will also be understood that the wheel under high speed, if it is out of balance from any cause, will have a tendency to cause the axle or that end of the shaft 18 to prescribe a certain orbit about the true axis of the wheel, and consequently the opposite end of said shaft will also prescribe a certain orbit around the true axis of the bearings and the wheel when still.

On Fig. 1, we have indicated on the tire T, indicated in light broken lines, the position of two substantially equal weight spots, as b and c, on opposite sides of the tire and at opposite sides of the wheel. When revolving at high speed, these two weight masses will tend to move toward the plane of the wheel represented by the middle line, and this force will cause certain vibration of the wheel at high speeds. The placing of weights, as a and d on the opposite positions, as indicated, will stop these vibrations and give balance to the wheel.

Referring now to Figs. 6, 7, 8 and 9 of the drawings, we have undertaken to chart certain vibratory actions under different conditions for illustrative purposes. On these drawings, the tire is outlined in light broken lines and is designated T; the record-receiving disc in each drawing is designated by the circle 29. The small broken line circle A in each figure is the circle prescribed by turning the wheel slowly by hand with the pencil on the disc, as before described, and is concentric with the axis of the wheel and the shaft when standing still.

The circle B in each case, may or may not be a true circle. In fact in actual tests this is more oval in form, depending on the different movements or vibrations of the wheel, caused by unbalanced conditions from different causes. If any vibration is caused in the wheel being tested, under high speed, it will cause the shaft 18 to prescribe orbits around the true axis at both ends thereof, with the bearing 20 acting as a fulcrum therefor. The record-receiving disc 29 also moves with that end of the shaft, and this causes a relative movement of the pencil 43 through the connections 35, 36 and 38, as before described.

Referring now to Fig. 6 of the drawings, the tire T is shown to have at the lower side a heavy spot W, with the result that when the wheel is turned at high speed, the centrifugal force in connection with this heavy spot will cause said wheel to vibrate, and inasmuch as the opposite end of the shaft 18 is yieldingly held so that it can prescribe an orbit about the true axis, it will move in such an orbit and will also cause a corresponding movement of the pencil in an opposite direction. That is, when the disc 29 on the end of said shaft 18 moves down, the pencil is moved up. If the pencil is moved into engagement with the disc 29 momentarily while it is under speed, the circle B will be the result. This would probably be more oval in shape than circular, according to the vibration. For inasmuch as the radial springs which hold the free end of the shaft in place are more under compression on top, as before described because of the weight of the wheel, said shaft will move through the lower side of the orbit it prescribes more easily than through the upper half of said orbit. In other words, by our mechanism and its connections with the marking pencil, any unbalanced condition of a wheel will cause the movement of the free end of the shaft and a corresponding movement of the pencil relative to the disc. That is, the disc 29 will be moved down with that end of the shaft, while the pencil 43, through its mounting, will be moved up, giving a related movement between the pencil and the record-receiving disc.

Figure 7:
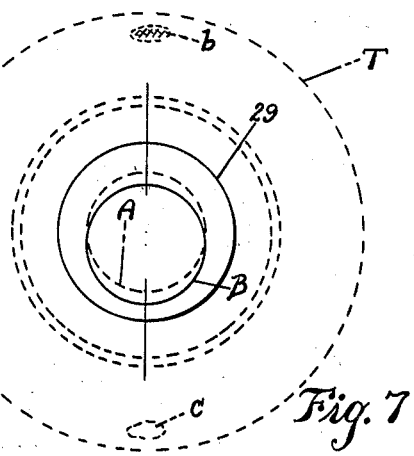

In Fig. 7, we have indicated a tire condition similar to that indicated on Fig. 1, where the opposed heavy spots are designated b and c, and where applied weights to offset are designated a and d. Where this condition exists, there is set up under speed a tendency in the wheel to tilt as the heavy spots b and c tend to move into the plane of rotation, indicated by the middle line on said figure. The pencil, when moved momentarily against the disc, would mark the circle B under speed, as indicated.

Figure 8:
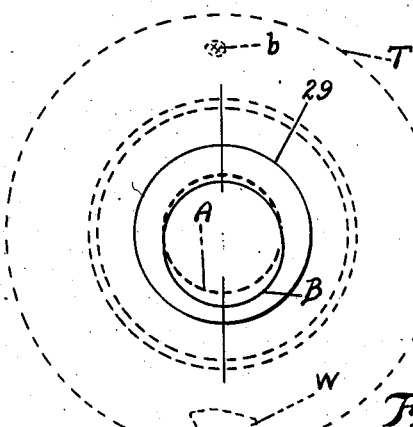

In Fig. 8, we have shown a tire having a weight mass at W and also a lighter weight spot at the opposite side of the wheel and on the opposite side of the tire. The weight mass W being heavier, the action is somewhat similar to that indicated in Fig. 7, but because of the heavier weight mass at W, the circle B is more oval in shape and the lower side is extended down further below the light broken line A than the upper side of said circle B is below the upper side of circle A. This is due to the opposed weights b and W, the weight W being heavier.

Figure 9:
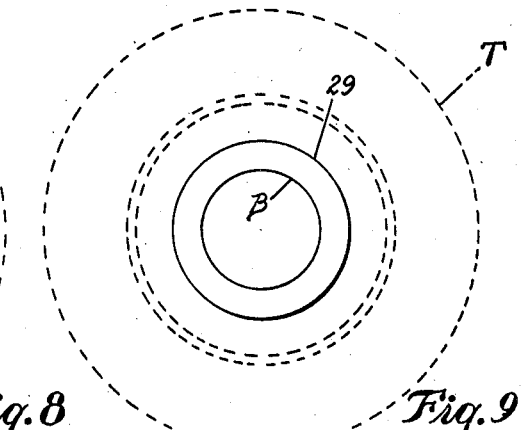

In Fig. 9, when the tire and wheel are balanced after these tests by the addition of the necessary weights, circles A and B are concentric, showing perfect balance.

These illustrations are given to indicate something of the variety of causes for out-of-balance, or unbalance, and how the mechanism shown and described and constituting the invention of this application makes it possible to detect the same and to correct it. They are only illustrative, of course, and each wheel and tire makes its own graph, according to the place and nature of its spot weights or light spots.

The invention, however, is best illustrated in Fig. 3, which shows the mechanism with which it is possible to detect the many ways in which a wheel or tire may be out of true balance.

We are aware that changes in the details of construction and arrangement can be made without departing from the spirit of the invention, and we do not, therefore, limit the invention to the specific showing made, except as we may be limited by the hereto appended claims.

We claim:

1. In a wheel balance testing apparatus, a supporting structure, a shaft horizontally supported therein in two axially spaced ball bearing sets, one of said ball bearing sets being inwardly from one end of said shaft to function as a fulcrum, means for mounting a wheel to be tested on the said end of said shaft, outside of the fulcrum thereof, whereby to cause lateral movement of the opposite end of said shaft, the opposite end of said shaft having its ball bearing set yieldingly supported to permit limited bodily circular movement of said shaft, a disc mounted on said opposite end of said shaft, outside of the ball bearing set permitting lateral bodily movement thereof, recording means movable against said disc for recording movement of said disc, and means actuated by the lateral movement of said shaft and connected for moving said recording means in the opposite direction on said disc to the movement of said shaft, for the purpose described.

2. In a wheel testing apparatus, a supporting structure, a shaft horizontally supported therein in axially spaced bearings, a wheel to be tested mounted on one end of said shaft, outside of one of said bearings, whereby said bearing can function as a fulcrum, means for centering said wheel with said shaft, said other bearing and said shaft being movable laterally and means on said other end of said shaft, outside of said other bearing, for receiving a record of the movement laterally of said shaft, caused by the wheel on the opposite end of said shaft outside of the fulcrum bearing, means for movably supporting a marking instrument to be moved against said means for receiving said record, operating connections from said supporting means, operable by the lateral movement of this end of said shaft, for moving said marking instrument in the opposite direction from the lateral movement of said shaft.

3. A wheel balance testing apparatus of the character shown and described and including a cylindrical housing, a shaft extended axially therethrough, a ball bearing set in one end of said housing to form a fulcrum for said shaft, means for mounting a wheel on the end of said shaft outside the said end of said housing, a ball bearing set in the other end of said housing for said shaft and yieldingly supported to permit limited lateral movement of this end of said shaft by the weight of the wheel on the other end of said shaft, a record receiving member on the end of said shaft outside the latter mentioned end of said housing, a record marking mechanism mounted on said housing with a member extended into said housing to bear upon said shaft within said housing, a marking member supported outside of said record receiving member and movable against the latter, and connecting lever means from the member extended into said housing and said marking member for moving the latter by the former and in an opposite direction, substantially as shown and described.

ROBERT M. GREENLEAF.
PAUL C. PALMER.